Oct. 22, 1968 D. P. COOPER 3,406,729
GULLET-GUARDED, CARBIDE-TIPPED SAW
Filed May 2, 1966

Delbert P. Cooper
INVENTOR
BY
Eugene D. Farley
Atty.

United States Patent Office 3,406,729
Patented Oct. 22, 1968

3,406,729
GULLET-GUARDED CARBIDE-TIPPED SAW
Delbert P. Cooper, 65 Irving Road,
Eugene, Oreg. 97402
Filed May 2, 1966, Ser. No. 546,763
4 Claims. (Cl. 143—133)

ABSTRACT OF THE DISCLOSURE

The outer margin of a saw plate is contoured at spaced intervals in a sequence of gullet and tip areas in each of which is secured a gullet insert and a tip insert of wear-resistant material. The gullet insert has bottom, rear and top faces and an arcuately concave front gullet face extending forward from the top face and merging with the saw plate. The gullet area of the saw plate has surfaces matching the bottom and rear faces of the gullet insert. The tip insert has a bottom face matching and abutting the top face of the gullet insert, a rear face aligned with the rear face of the gullet insert, and a front face merging with the gullet face of the gullet insert to form a continuous gullet.

---

Figure 1:
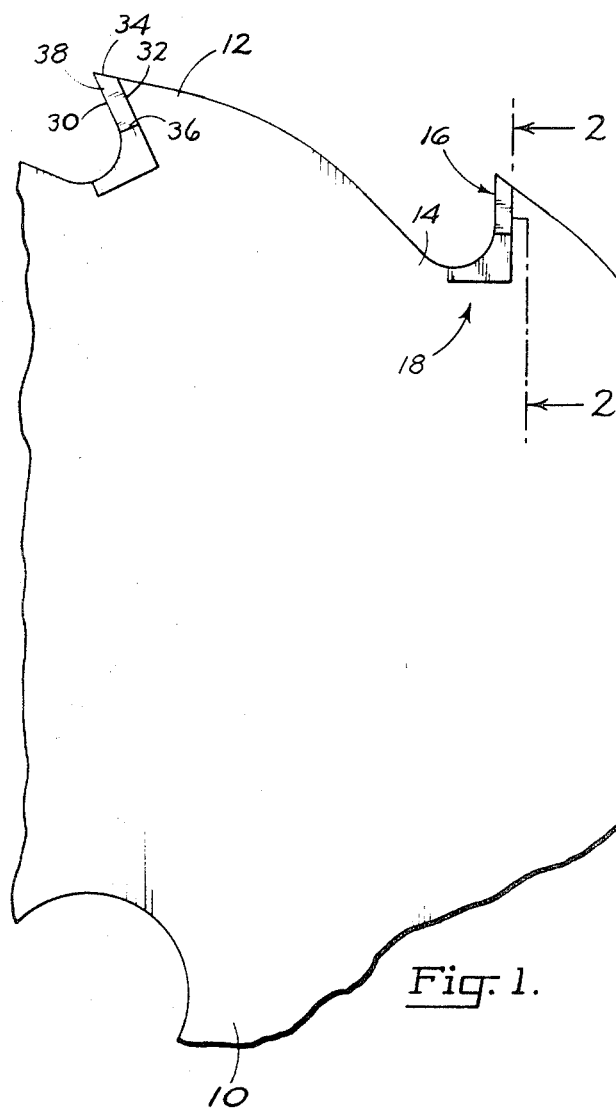

This invention relates to saws tipped with wear-resistant metals. It relates particularly to edger-type or other thin circular saws provided with carbide tips and having guarded gullets.

Carbide-tipped saws have two principal advantages. First, they minimize kerf and consequently increase substantially the volume of lumber which can be cut from a given log. Second, they retain a sharp cutting edge much longer than do conventional saws.

The use of carbide-tipped saws is attended, however, by a serious disadvantage: they heretofore have not been provided with means for efficient removal of sawdust from the saw cut. The resultant friction causes the saw plate to heat and to wear. When the saw heats, it expands, with the result that it no longer runs true but flutters, vibrates and cuts inaccurately. As the saw wears, its operational efficiency and service life are reduced.

Also, the invention is described herein having tips composed reference to carbide-tipped saws, i.e. to saws having tips composed of tungsten carbide or to saws manufactured with cutting tips clad or armored with a thin coating of that material. However, it is to be understood that the invention is applicable with equal effectiveness to saws having tips composed of, or clad or armored with, other wear-resistant alloys or metals, for example, with stellite or with chromium.

As is well known, all saws have some provision for the removal of sawdust from the kerf. Hand saws are provided with teeth of opposite set. Drag saws are provided with raker teeth. In band saws the gullets are specially sharpened. In conventional heavy duty circular saws, the teeth are maintained in position with holding rings specially designed to remove the sawdust.

In edger and other thin circular saws of the class particularly considered herein, the gullets are provided with sharp edges and accordingly function to remove the sawdust. These edges normally are maintained during the service life of the saw because they are ground out each time the saw is sharpened, about every four hours.

However, when the saws are carbide tipped, the tips stay sharp for a much longer period of operation, about 40 hours. During this time the edges of the gullets become worn and rounded, with the result that the sawdust can slide by the edges of the gullet, into the kerf between the lumber and the saw plate. This causes the serious operating problems noted above.

It accordingly is the general purpose of the present invention to provide a saw, particularly a thin edger saw, provided with tips of tungsten carbide or other hard, wear-resistant material, and provided also with carbide gullet inserts dimensioned and designed to protect and guard the gullet and to remove the sawdust efficiently from the saw kerf for a period of time at least as long as the saw teeth maintain their efficient cutting action.

It is a corollary object of the invention to provide a carbide-tipped saw which remains sharp over a protracted operating cycle and which accordingly cuts true and remains free from vibrational problems.

Figure 2:
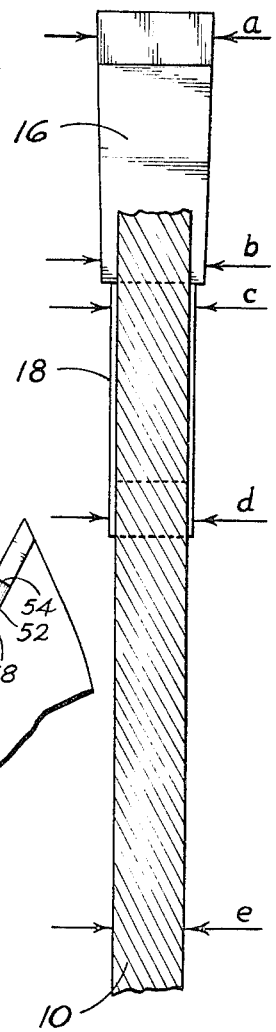

In the drawings:

FIG. 1 is a fragmentary plan view of a circular saw embodying the carbide tip and gullet construction of the present invention; and FIG. 2 is a fragmentary sectional view taken along line 2—2 of FIG. 1.

The presently described saw broadly comprises a saw plate having an outer margin contoured in a sequence of tip and gullet areas at predetermined spacings. A plurality of carbide saw tips are fixed to the plate, one on each of the tip areas.

A plurality of carbide gullet inserts are fixed to the saw plate, one on each of the gullet areas. The front faces of each pair of tips and inserts merge with each other and with the edge of the saw plate to form a continuous gullet. The thickness of each tip is at least as great as the thickness of each insert and the thickness of each insert is at least as great as the thickness of the saw plate.

During use of the saw, the gullet carries away the sawdust in the usual manner. However, the efficiency of sawdust removal by the gullets remains at a high level at all times. Since the gullet edges are of carbide and do not do any cutting, they remain sharp longer than do the cutting edges of the tips. This insures that as long as the tips are in cutting condition, the gullets will perform efficiently their assigned function of sawdust removal.

Considering the foregoing in greater detail and with particular reference to the drawings:

As described herein, the invention is applied to circular saws, particularly thin circular saws of the edger type in which the teeth are fixed directly to the saw plate, rather than held in place by the agency of rings or shanks. It is to be understood, however, that the invention may be applied to thick circular saws as well as to thin circular saws, and also to saws of other categories having arcuate gullets, such as gang saws, where the problems outlined above are present.

In the drawings, 10 indicates the circular or other saw plate. It is fabricated in the usual manner from usual materials and is provided along its outer margin with a sequence of tip areas 12 and gullet areas 14 at predetermined angular spacings.

For the purpose of the present invention, the saw plate is milled to provide seats for a plurality of carbide tips or bits, indicated generally at 16 and a plurality of cooperating carbide gullet inserts, indicated generally at 18.

The carbide tips 16 are of substantially conventional construction. The working edge of each tip is ground to the appropriate cutting angle. The thickness of each tip, viewed in transverse cross section, is greater at the top than at the bottom. This is shown in FIG. 2, where dimension $a$ is indicated to be greater than dimension $b$.

Except for its cutting edge and side taper, each tip is relatively rectangular in contour and accordingly is provided with a front face 30, a back face 32, a top face 34, a bottom face 36 and a pair of opposed side faces 38. Bottom face 36 is preferably squared and at right angles to back face 32. Front face 30 also is squared, to provide sharp edges.

The gullet inserts indicated generally at 18 may be formed integrally with tips 16. However, it is provided to form them separately, since they are installed more or less permanently in the saw plate, whereas the tips are replaced from time to time as a consequence of operating wear.

Like tips 16, gullet inserts 18 are comprised of tungsten carbide or other wear resistant alloy. The edges of each gullet insert are squared, providing a unit including a front face 50, a back face 52, a top face 54, a bottom face 56, and a pair of opposite side faces 58.

Front face 50 of the gullet insert is arcuate in contour. Its angular relation with respect to side faces 58 is such as to form sharp edges. It merges with front face 30 of the companion tip 16, as well as with the adjacent edge of saw plate 10 to form a continuous gullet of the desired arcuate contour. Back face 52 lies substantially at right angles to lower face 56 so that the insert seats securely in the socket in saw plate 10 in which it is received.

In contradistinction to tip 16, gullet insert 18 preferably is of substantially uniform thickness along its length, i.e. dimension $c$ of FIG. 2 is substantially equal to dimension $d$.

However, it is important for the satisfactory performance of the selective functions of the two elements, i.e. the cutting function of tip 16 and the sawdust removing function of insert 18, that the thickness of the lower portion of tip 16 be at least as great as the thickness of the insert, i.e. dimension $b$ of FIG. 2 should be at least as great as dimension $c$ of that figure. Preferably the thickness of the lower portion of the tip is greater than the thickness of the gullet insert. The tip thus makes the cut and the insert, moving in the resulting kerf, clears away the sawdust.

It also is of importance for satisfactory operation of the unit that a specified relationship exist between the thickness of gullet insert 18 and the thickness of saw blade 10. To achieve best results, the thickness of the gullet insert should be at least as great as the thickness of the saw plate, i.e. dimension $d$ of FIG. 2 should be at least as great as dimension $e$ of that figure. Preferably, the thickness of the gullet insert is greater than the thickness of the saw plate. As a result, the gullet insert preserves its normal function of removing sawdust from the kerf while the saw plate moves freely therein without wedging, binding, or scoring.

In the manufacture of the presently described saw, the saw plate first is milled out with squared recesses dimensioned to receive the carbide tips and inserts. Gullet inserts 18 are fixed in place by silver soldering or other suitable technique. Tips 16 are abutted against and aligned with inserts 18 and secured in place by the same or a similar technique. The applied inserts and tips then are dressed down and the tips sharpened, whereupon the saw is ready for use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A saw comprising:
    (a) a saw plate having its outer margin contoured at predetermined spacings in a sequence of gullet and tip areas,
    (b) a wear-resistant gullet insert fixed to the saw plate in each gullet area, the gullet insert having bottom, rear and top faces and an arcuately concave front gullet face extending forward from the top face and merging with the saw plate,
    (c) the gullet area of the saw plate having surfaces matching the bottom and rear faces of the gullet insert,
    (d) a wear-resistant tip insert fixed to the saw plate in each tip area, the tip insert having a bottom face matching and abutting the top face of the gullet insert, a rear face aligned with the rear face of the gullet insert, and a front face merging with the gullet face of the gullet insert to form a continuous gullet,
    (e) the thickness of each tip insert being at least as great as the thickness of each gullet insert, and
    (f) the thickness of each gullet insert being at least as great as the thickness of the saw plate.

2. The saw of claim 1 wherein the thickness of each tip insert is greater than the thickness of each gullet insert.

3. The saw of claim 1 wherein the thickness of each gullet insert is greater than the thickness of the saw plate.

4. The saw of claim 1 wherein the thickness of each tip insert is greater than the thickness of each gullet insert and the thickness of each gullet insert is greater than the thickness of the saw plate.

References Cited
UNITED STATES PATENTS

| | | | |
|---|---|---|---|
| 207,003 | 8/1878 | Berry | 143—150 |
| 326,685 | 9/1885 | Simonds | 143—151 |
| 3,261,384 | 7/1966 | Henderson | 143—133 |

DONALD R. SCHRAN, *Primary Examiner.*